United States Patent [19]

Rao

[11] 4,283,525

[45] Aug. 11, 1981

[54] CONTINUOUS PROCESS FOR INCREASING DISCRETE PARTICLE SIZE OF SOLUTION CARBOXYL POLYMERS

[75] Inventor: Krishna K. Rao, Paterson, N.J.

[73] Assignee: National Starch and Chemical Corporation, Bridgewater, N.J.

[21] Appl. No.: 122,385

[22] Filed: Feb. 19, 1980

[51] Int. Cl.$^3$ ............................ C08F 6/12; C08F 6/10; C08F 6/24
[52] U.S. Cl. ..................................... 528/489; 424/71; 528/483; 528/490; 528/492; 528/500; 528/502
[58] Field of Search ............... 528/480, 483, 489, 490, 528/492

[56] References Cited

U.S. PATENT DOCUMENTS

| | | | |
|---|---|---|---|
| 3,041,318 | 6/1962 | Hess | 528/489 X |
| 3,677,991 | 7/1972 | Moore | 528/489 X |
| 3,927,199 | 12/1975 | Micchelli | 424/47 |

FOREIGN PATENT DOCUMENTS 46-7115021  4/1971  Japan ........................................ 525/378

*Primary Examiner*—C. A. Henderson
*Attorney, Agent, or Firm*—Edwin M. Szala; Janet E. Hasak

[57] ABSTRACT

In an improved process for preparing discrete particles from solution polymers in which water and neutralizing agent are added to the polymer to form a suspension, the organic solvent is removed therefrom, and the particles are collected by filtration, washing and drying, the suspension is formed by co-feeding the flowable polymer and the aqueous phase containing neutralizing agent into a reactor vessel under specified conditions; stirring the reactants; and discharging the resultant suspension from the reactor vessel, with all steps being carried out in a continuous manner. In one embodiment of the process, additional neutralizing agent, which is preferably sodium hydroxide, is added to the suspension during removal of the solvent therefrom.

9 Claims, No Drawings

CONTINUOUS PROCESS FOR INCREASING DISCRETE PARTICLE SIZE OF SOLUTION CARBOXYL POLYMERS

BACKGROUND OF THE INVENTION

This invention relates to an improved continuous process for preparing discrete particles from a solution polymer, whereby the size of the particles is controlled to be optimized within a given range, thus enabling rigid filtration and subsequent facile drying of the particles.

A wide variety of polymeric products are currently being marketed for use in such applications as reprographic processes and in hair conditioning and treatment formulations such as that described in U.S. Pat. No. 3,927,199. For ease of handling, in particular, such products are often sold in the form of discrete, spherical particles commonly known in the art as beads or pearls.

The typical manufacture of discrete polymer pearls from polymeric systems involves several steps which are carried out in batch operations. In the first step, selected monomers are solution polymerized in an organic solvent or co-solvent system in the presence of a free-radical catalyst. The solution polymers which result are one-phase systems of high viscosity. In the second step, cold water and a surfactant or protective colloid are added to the non-agitated, hot polymerization system, whereupon agitation is commenced at a prefixed speed. This mixing transforms the solution polymer into a non-viscous suspension of discrete pearls in a continuous aqueous phase. Recovery of the pearls themselves can be accomplished by removing the organic solvent(s) from the suspension and subjecting the remaining pearls to filtration, washing and drying.

The size of the pearls thus obtained can be very important with respect to their subsequent use, particularly in the manufacture of hair treatment products. There is a desirable particle size for any given system depending on the properties required in the final product. For example, it is known that less odor is retained in the final product when the particles, after being washed and subjected to an extended soak and heat cycle, are of a relatively small size. However, a particle size which is too small can cause equipment plugging, especially during filtration and drying, and may retain higher water content in the wet pearl cake. In addition, small particle size may render the emulsion non-filterable. As a further disadvantage, small pearls must be spray-dried as a slurry, a rather costly technique as compared with fluidized drying of the cake, rotary drying and the like, due to the added energy expended on reslurrying and ultimately removing the solvent, usually water, from the system.

The size of the pearls can be controlled by varying such parameters as, for example, the amount of surfactant or protective colloid, agitator speed, agitator type, residence time, and the temperature of the polymeric reaction mixture before water is added thereto. In practice, the parameter most frequently varied in the prior art is the amount of surfactant or colloid, which, when reduced at a given agitator speed and temperature, results in the production of a larger particle size. While the obtaining of such larger particles would theoretically eliminate the problems encountered on filtration and drying as discussed above, these large particles tend to coalesce and coagulate into a large mass during solvent removal, due to the absence of sufficient protective colloid or surfactant present. The purpose of the surfactant or protective colloid is to prevent the coagulation by generating suspended particles which are not too large and which remain discrete under the given conditions of mixing and heat.

In lieu of the surfactant and/or protective colloid, a neutralizing agent, which is generally a common base, is often employed to impart certain properties to the pearls. The neutralizing agent, which serves to neutralize any free carboxyl groups remaining in the solution polymer, is particularly desirable in the preparation of hair treatment products where the polymers should be transparent (non-hazy) when ultimately incorporated into the hair care formulations. However, use of relatively large amounts of neutralizing agent results in a non-filterable emulsion, and use of smaller amounts, as with the surfactant and protective colloid, leads to system instability.

Accordingly, it is an object of the present invention to provide an improved, continuous process for increasing discrete particle size of solution polymers to a controlled level without accompanying filtration or drying problems and without adversely affecting the stability of the system.

SUMMARY OF THE INVENTION

The above and related objects are achieved by improving the process for preparing discrete particles from a solution polymer in which process an aqueous phase comprising water and neutralizing agent is added to the solution polymer to form discrete particles, the organic solvent is removed from the polymer, and the resultant polymer particles are filtered, washed and dried. The improvement herein resides in the formation of the particles and comprises the steps of:

(a) continuously co-feeding into a reactor vessel (1) an aqueous phase containing the neutralizing agent in an amount of 1 to 20%, on a molar basis, of the total carboxyl-containing monomers employed in the polymerization, and (2) the solution polymer in flowable form;

(b) continuously stirring together the aqueous phase and polymer to form a suspension such that the weight ratio of polymer solids to aqueous phase during the co-feeding operation is between about 1:20 and 10:1; and (c) continuously discharging the suspension from the reactor vessel at a rate which is substantially equal to the rate at which the aqueous phase and polymer are co-fed into the reactor vessel.

When the amount of neutralizing agent is insufficient to impart the desired stability to the particles, additional neutralizing agent may be added slowly during solvent removal. It is unexpected that such addition does not reduce the size of the formed pearls.

The process of this invention results in about a three- to four-fold increase in particle size as compared to the batch system manufacture, achievable at the same level of neutralizing agent. Thus, particle size is increased without sacrificing the stability of the system.

In the batch process it is known that particle size can be increased by decreasing agitator speed, when the temperature and level of neutralizing agent of the system are held constant. It is thus unexpected that particle size would be increased by the continuous process of this invention, where the two streams of reactants at a given speed and temperature are co-fed into a reactor vessel at a higher effective agitator speed (due to the fact that the volume fed into the reactor at any given instant is smaller).

DESCRIPTION OF THE PREFERRED EMBODIMENTS

The polymeric systems which can be employed in the process of this invention are solution polymers which result in the formation of discrete pearls when water is added thereto. Particularly preferred herein are those solution polymeric systems described in U.S. Pat. No. 3,927,199, which are interpolymers derived from N-alkyl acrylamides or methacrylamides, acidic film-forming comonomers, and at least one polymerizable comonomer. The acidic comonomers, referred to hereinafter as "carboxyl-containing monomers", contain at least one available carboxyl group which is neutralizable by a common base, and include, e.g., acrylic or methacrylic acid, maleic acid, crotonic acid, and the like, as well as the anhydride and half-ester derivatives of the diacids.

As for the actual preparation of the polymers, there may be employed any of the usual free-radical-initiated processes utilizing solution polymerization techniques which are well known to those skilled in the art and which are particularly suited for the polymer whose preparation is desired.

The novel feature of the process herein resides in the step wherein the solution polymer is converted into pearls. This conversion is accomplished by continuously co-feeding into a reactor vessel the solution polymer and an aqueous phase consisting of ambient water which contains a neutralizing agent. It may also be possible to substitute a surfactant such as polyvinyl alcohol or a protective colloid for the neutralizing agent herein. The solution polymer must be in flowable form during the co-feeding operation. Since the polymers are usually highly viscous at room temperature, they are generally maintained while in the inlet tube at a temperature at which they have a sufficiently low viscosity for good feed control, typically up to about 1000 cps, depending, for example, on the rheology characteristics of the polymer. The maximum temperature in maintaining the polymer in a flowable form is that slightly below the reflux temperature of the system. The minimum temperature is preferably about 35° C., but it is noted that the proper temperature will vary considerably with, for example, the solvent system employed, the solids content of the system, and the molecular weight of the polymer.

The solution polymer and the aqueous phase are generally co-fed and agitated at a rate sufficient to provide at all times a weight ratio of solution polymer solids to aqueous phase of about 1:20 to 10:1 for practical considerations, and preferably 1:2–2:1. Typically, the flow rate of the polymer system is about 280–320 cc/hour, preferably about 300 cc/hour, and the flow rate of the aqueous phase is 230–270 cc/hour, preferably about 250 cc/hour. The exact rate employed will depend on the particle size desired, which in turn depends on, for example, the agitator speed, the temperature of the polymer, the concentration of polymer, and the amount of neutralizing agent employed. While the co-additions are taking place, the ingredients coming into contact with each other are continuously stirred at a constant speed to effect and/or facilitate formation of a dispersion of a desired particle size.

Suitable neutralizing agents in accordance with the process of this invention are alkaline reagents such as, for example, sodium, potassium, and ammonium hydroxide, ammonia, primary, secondary and tertiary amines, alkanolamines, and hydroxyamines such as 2-amino-2-methylpropanol and 2-amino-2-methyl-1,3-propanediol. Preferred neutralizing agents herein are sodium, potassium and ammonium hydroxide. Sodium hydroxide is particularly preferred for use herein.

The amount of neutralizing agent ordinarily utilized in the process of this invention must be at least sufficient to protect the pearls from coagulation during solvent removal, but is also governed by the desired size of the final pearl. For purposes herein, the amount of neutralizing agent employed is about 1–20%, on a molar basis, of the total carboxyl-containing monomers employed in the polymerization, with the specific amount used in any given application depending on the particular polymer system and the degree of conversion achieved. Preferably, the amount of neutralizing agent is between about 2 and 12%, on a molar basis.

In the continuous process for formation of the discrete particles of this invention, the reactants are typically co-fed into a reactor vessel which provides agitation for the suspension and which allows the suspension containing the pearls to exit therefrom, at a rate which is substantially equal to the rate at which the reactants are co-fed into the vessel. The suspension is thereafter collected and the organic solvent remaining is driven off by any suitable means such as by steam heat or vacuum stripping, either continuously or in batch manner. The resulting aqueous dispersion is then filtered, washed and dried, in a continuous manner or batchwise, as is well known in the art. Additional neutralizing agent, in small amounts (for example, 15%, on a molar basis, based on total carboxyl-containing monomers employed in the polymerization), may be added to the system during solvent removal to insure stability of the pearls, particularly when their size has been maximized by employing lesser amounts of neutralizing agent in the aqueous phase. This addition of neutralizing agent does not appear to reduce the particle size.

The dried pearls obtained by the process herein are of comparable size (at least about 150 microns, and preferably 180 to 250 microns) to those obtained by the prior art process, wherein the level of neutralizing agent is reduced at a given agitator speed. However, in the present process, in contrast to that of the prior art, the pearls do not agglomerate and co-adhere upon removal of solvent, because sufficient neutralizing agent remains to protect the individual particles. The spray-dried particles of the prior art which are prepared using comparable amounts of surfactant or neutralizing agent have a particle size of about 40 to 70 microns. The pearls of the present invention are suitable in any application where they are desirable or required, and particularly in the preparation of hair treatment formulations.

The following examples will illustrate the embodiments of the invention. In the examples, all parts and percentages are by weight and all temperatures in degrees Centigrade unless otherwise noted.

In the examples illustrating the process herein, the following procedure was utilized to simulate a continuous mode operation in a batch reactor. A two-liter reactor was charged with both feeds (polymer system and aqueous phase) to 20% of its capacity, and pearlization was effected by agitation in the standard batch manner. Hot solution polymer at a temperature of about 66° C. was fed through one jacketed inlet tube connected to the reactor, and water having neutralizing agent dissolved therein was fed through a second inlet tube. The rate of flow of the solution polymer was not controlled; but the flow rate of the aqueous solution was adjusted to maintain the polymer solids-to-aqueous phase ratio at between 1:2 and 2:1. The ingredients were continuously agitated at a constant speed.

After eight hours of continuous flow and agitation, the resultant suspension was withdrawn from the reactor vessel and stored in a refrigerator overnight. A small amount of this batch was employed as "seed" for the next day when co-feeding of hot polymer system and aqueous phase was resumed. Each day photographs of the wet pearls were taken and the ratio of seed batch to total batch volume was calculated. This procedure was repeated until 80 to 95% of the total batch was prepared from the co-feeding technique.

EXAMPLE I (comparative)

A solution polymer was prepared by reacting methyl methacrylate, octyl acrylamide, hydroxypropyl methacrylate, t-butylaminoethyl methacrylate and acrylic acid in isopropyl acetate and ethanol in the presence of a free-radical polymerization catalyst. The acrylic acid comprised about 16% of the total monomers reacted. The polymerization procedure is essentially described in U.S. Pat. No. 3,927,199.

A portion of the solution polymer thus prepared was pearlized by the standard batch procedure as described in the prior art. A series of experiments (Runs 1–8) were performed in which varying amounts of sodium hydroxide in cold water were added to the hot polymer solution and subsequently stirred to form the pearls.

Photographs of the wet pearls prior to solvent stripping were taken and the sizes of each were determined. Solvent removal by direct steam stripping was performed on the pearlized batches, and the results are indicated in Table I.

It can be seen that with decreasing amounts of sodium hydroxide wet particle size increases, but the system becomes more unstable. On the other hand, high levels of sodium hydroxide render the resultant emulsified system to be non-filterable.

TABLE I

| Run | Weight of Polymer Solution (g)* | Weight of Water (g) | Percent Sodium Hydroxide (molar, based on total carboxyl monomers) | Wet Particle Size (microns) | System Stability during Solvent Removal | System Filterability |
| --- | --- | --- | --- | --- | --- | --- |
| 1 | 500 | 438 | 8.1 | 2–6 | foamy, stable | non-filterable emulsion |
| 2 | 500 | 438 | 16.2 | ≦2 | extremely foamy, stable | non-filterable emulsion |
| 3 | 746 | 642 | 11.4 | ≦2 | extremely foamy, stable | non-filterable emulsion |
| 4 | 373 | 326 | 5.7 | 8–12 | foamy, stable | filterable |
| 5 | 373 | 326 | 4.1 | 16–80 | less foamy, stable | filterable |
| 6 | 559 | 490 | 3.2 | 32–80 | coagulated, unstable | N.A.** |
| 7 | 559 | 490 | 2.4 | 60–70 | coagulated, unstable | N.A.** |
| 8 | 559 | 490 | 1.6 | — | no dispersion; did not pearlize | N.A.** |

*at 50–60% polymer solids.
**N.A. = non-applicable.

EXAMPLE II

This example illustrates the use of the co-feeding technique of this invention at various levels of neutralizing agent.

The solution polymer as prepared in Example I was employed in three series of experiments (Runs 9–11) to produce pearls at various levels of sodium hydroxide. After batch preparation of the initial reactor charge (Runs 9A–11A), the co-feeding technique above described was initiated and continued until about 60 to 95% of the final suspension had been prepared by the continuous mode. The resultant pearls were measured for their size at the initial, intermediate and final stages of the technique, before solvent removal. The results are indicated in Table II.

It can be seen that the technique of co-feeding the polymer and sodium hydroxide solution in accordance with this invention produces wet particles of larger size than those of the batch procedure in every instance.

EXAMPLE III

The particle sizes of the dried pearls at two different levels of sodium hydroxide prepared by the co-feeding process herein were compared with the particle size of the spray-dried pearls prepared by the standard batch procedure. The suspension of wet pearls of Runs 9D and 10C were steam-stripped to remove the organic solvent, filtered, washed and dried by both air drying and by forced draft drying. In Run 10C, steam stripping was accomplished at 95° C. instead of 100° C. to avoid coalescing of the pearlized batch. In the preparation of the control, wet pearls obtained by the batch procedure at 4.1% sodium hydroxide level (similar to Run 5 of Example 1) were stripped of solvent, filtered, resuspended and spray-dried.

TABLE II

| Run | Weight of Polymer Solution (g)** | Weight of Water (g) | Percent of Sodium Hydroxide (molar) at End of Co-Feed | Time for Slow Addition (hours) | Percent Volume of Initial Seed to Total System | Wet Particle Size (microns) |
| --- | --- | --- | --- | --- | --- | --- |
| 9A* | 744 | 652 | 5.7 | 0 | 100 | 8–12 |
| 9B | 840 | 740 | 5.7 | 3.0 | 47 | 80–120 |
| 9C | 1050 | 850 | 5.3 | 3.0 | 15 | 80 |
| 9D | 1050 | 900 | 5.5 | 4.0 | 5 | 60–80 |
| 10A* | 372 | 326 | 5.3 | 0 | 100 | <10 |
| 10B | 600 | 325 | 3.2 | 1.5 | 30 | ca. 80 |
| 10C | 480 | 250 | 3.1 | 3.0 | 20 | ca. 80 |
| 11A* | 560 | 490 | 11.5 | 0 | 100 | very fine emulsion |

TABLE II-continued

| Run | Weight of Polymer Solution (g)** | Weight of Water (g) | Percent of Sodium Hydroxide (molar) at End of Co-Feed | Time for Slow Addition (hours) | Percent Volume of Initial Seed to Total System | Wet Particle Size (microns) |
|---|---|---|---|---|---|---|
| 11B | 900 | 300 | 11.5 | 3.5 | 38 | (less than 10) 16–25 |

*Comparative runs employing the batch (seed) process.
**at 50–60% polymer solids.

Sieve analyses were performed on the above samples and the average particle size of each was determined. The results are indicated in Table III.

TABLE III

| Run: | Control | 9D | | 10C | |
|---|---|---|---|---|---|
| Process: | Batch | Co-Feed | | Co-Feed | |
| NaOH level: (molar basis) | 4.1% | 5.5% | | 3.1% | |
| Drying Method: | Spray-dried | Forced Draft | Air | Forced Draft | Air |
| Screen Analysis: | | | | | |
| Mesh   Microns | | (% of particles) | | | |
| 30       595 | 0.0 | 9.9 | 10.8 | 7.4 | 8.0 |
| 50       297 | 0.0 | 16.1 | 30.0 | 36.8 | 44.1 |
| 100     149 | 0.0 | 42.9 | 28.9 | 48.9 | 43.8 |
| 200     74 | 61.9 | 25.3 | 23.3 | 6.8 | 4.1 |
| 325     44 | 35.1 | 5.6 | 6.8 | 0.0 | 0.0 |
| 325     44 | 3.0 | 0.0 | 0.0 | 0.0 | 0.0 |
| Particle Size-weighted average (microns) | 60 | 190 | 215 | 230 | 245 |

It is seen that the control consists of very small particles, whereas Runs 9D and 10C representing the present invention and containing 5.5 and 3.1% sodium hydroxide, respectively, consist of a majority of relatively large particles which compare favorably in size to the particles of typical polymers used in commercial hair care products.

EXAMPLE IV

This example illustrates the stabilizing effect of adding sodium hydroxide to the polymer during solvent removal.

The polymer employed in Example I was co-fed with water to the reactor vessel in accordance with the procedure herein described at a flow rate sufficient to give a polymer solids-to-water weight ratio of 1:1.25, and to give a 3.2% sodium hydroxide level at the end of the addition period. The percent volume of initial seed to total system was 35%.

The resulting polymer suspension was separated into two portions, one of which was steam-heated to remove the solvent. Continuation of steam distillation beyond 95° C. resulted in coagulation. Thus, a repeat experiment was conducted and distillation discontinued at 90° C. The recovered pearls were filtered and dried. Sodium hydroxide was added slowly to the second portion of polymer suspension during solvent removal to bring the total level of neutralizing agent to 5.7%, molar basis, of the total carboxyl-containing monomers employed in the polymerization. The solvent was thereafter removed at up to 100° C. by steam distillation, and the particles were filtered and dried as previously. The average particle size was found to be similar in both cases, but there was far less agglomeration of the pearls in the finished sample to which more sodium hydroxide was added.

EXAMPLE V

When potassium and ammonium hydroxide are used respectively as the neutralizing agent in lieu of sodium hydroxide for the interpolymer of Example I, comparable results in terms of particle size and stability of the particles are observed.

In summary, the present invention is seen to provide an improved process for increasing discrete particle size of solution polymers without difficulties in filtration of drying of the particles and without an adverse effect on the stability of the particles.

Now that the preferred embodiments of the present invention have been described in detail, various modifications and improvements thereon will become readily apparent to the practitioner. Therefore, the spirit and scope of the invention are to be limited only by the appended claims, and not by the foregoing specification.

What is claimed is:

1. A process for producing discrete particles from a carboxyl-containing solution polymer comprising the steps of:
   (a) continuously co-feeding into a reactor vessel (1) said solution polymer in an organic solvent or co-solvent system in flowable form, and (2) an aqueous phase containing an alkaline reagent in an amount of 1 to 20%, on a molar basis, of the total carboxyl-containing monomers employed in the polymerization;
   (b) continuously stirring together said aqueous phase and said polymer to form a suspension such that the weight ratio of polymer solids to aqueous phase during the co-feeding operation is between about 1:20 and 10:1; and
   (c) continuously discharging said suspension from the reactor vessel at a rate which is substantially equal to the rate at which said aqueous phase and said polymer are co-fed into the reactor vessel, in which process the size of the polymeric particles produced is increased without destabilization thereof.

2. The process of claim 1 wherein said polymer is at a temperature of from at least about 35° C. to a temperature below reflux temperature of said polymer.

3. The process of claim 1 wherein said aqueous phase contains said alkaline reagent in an amount of 2 to 12%, on a molar basis, of the total carboxyl-containing monomers employed in the polymerization.

4. The process of claim 1 wherein said weight ratio of polymer to aqueous phase is between about 1:2 and 2:1.

5. The process of claim 1 wherein said polymer is an interpolymer derived from N-alkyl acrylamide or methacrylamide, an acidic film-forming comonomer, and at least one polymerizable comonomer.

6. The process of claim 1 wherein said alkaline reagent is ammonium, potassium or sodium hydroxide.

7. The process of claim 1 further comprising the steps of removing said organic solvent from said suspension of particles, and filtering, washing and drying said particles.

8. The process of claim 7 wherein during solvent removal additional alkaline reagent is added to said suspension.

9. The process of claim 1 wherein said alkaline reagent is selected from the group consisting of sodium hydroxide, potassium hydroxide, ammonium hydroxide, ammonia, primary amines, secondary amines, tertiary amines, alkanolamines, and hydroxyamines.

* * * * *